Figure 15:
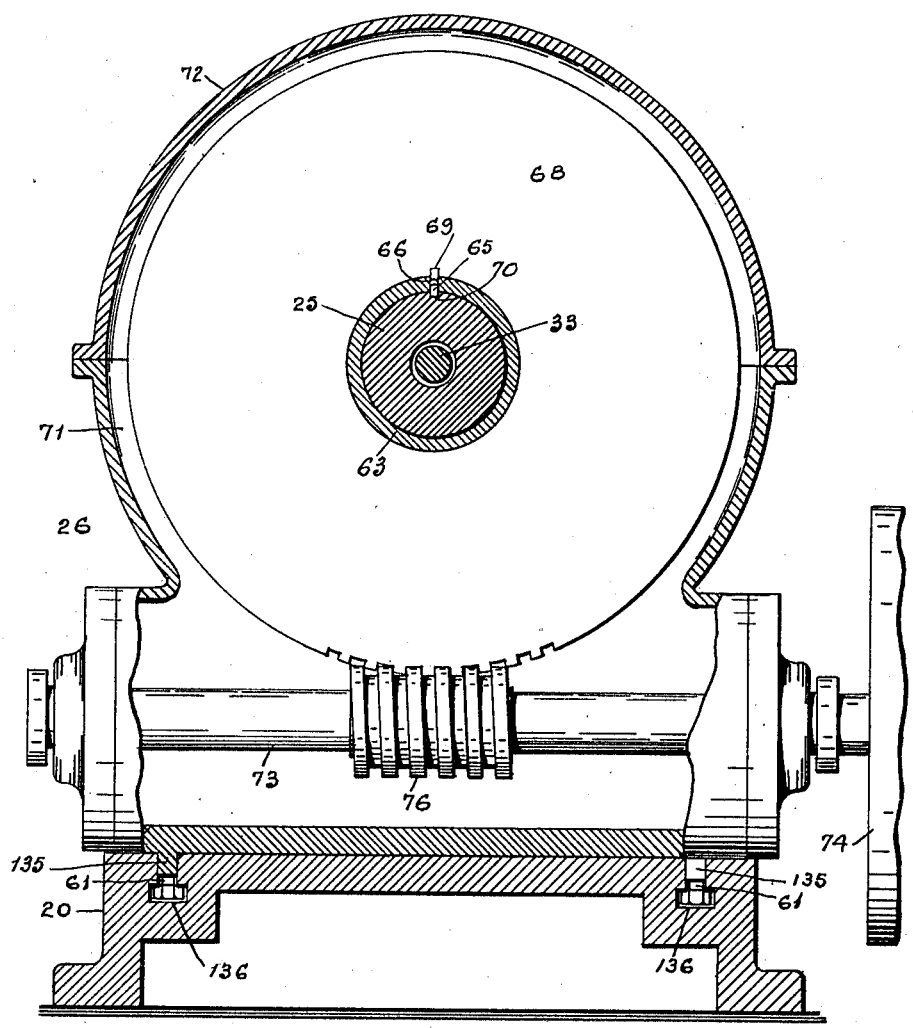

R. W. STOCK.
PIPE FLANGING MACHINE.
APPLICATION FILED DEC. 14, 1908.
1,004,492.
Patented Sept. 26, 1911.
7 SHEETS—SHEET 1.
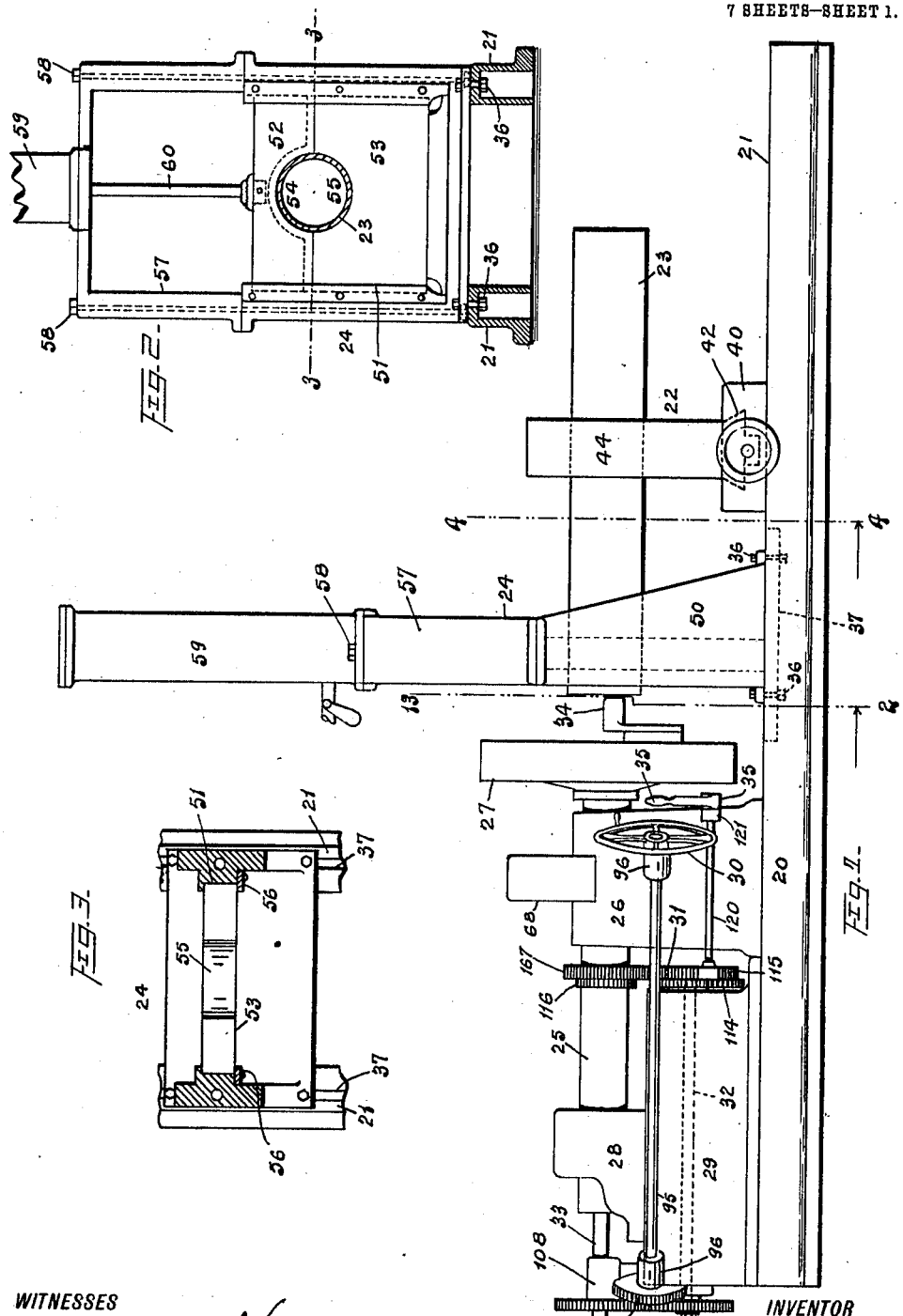
WITNESSES
INVENTOR
BY
ATTORNEY.

R. W. STOCK.
PIPE FLANGING MACHINE.
APPLICATION FILED DEC. 14, 1908.
1,004,492.
Patented Sept. 26, 1911.
7 SHEETS—SHEET 2.
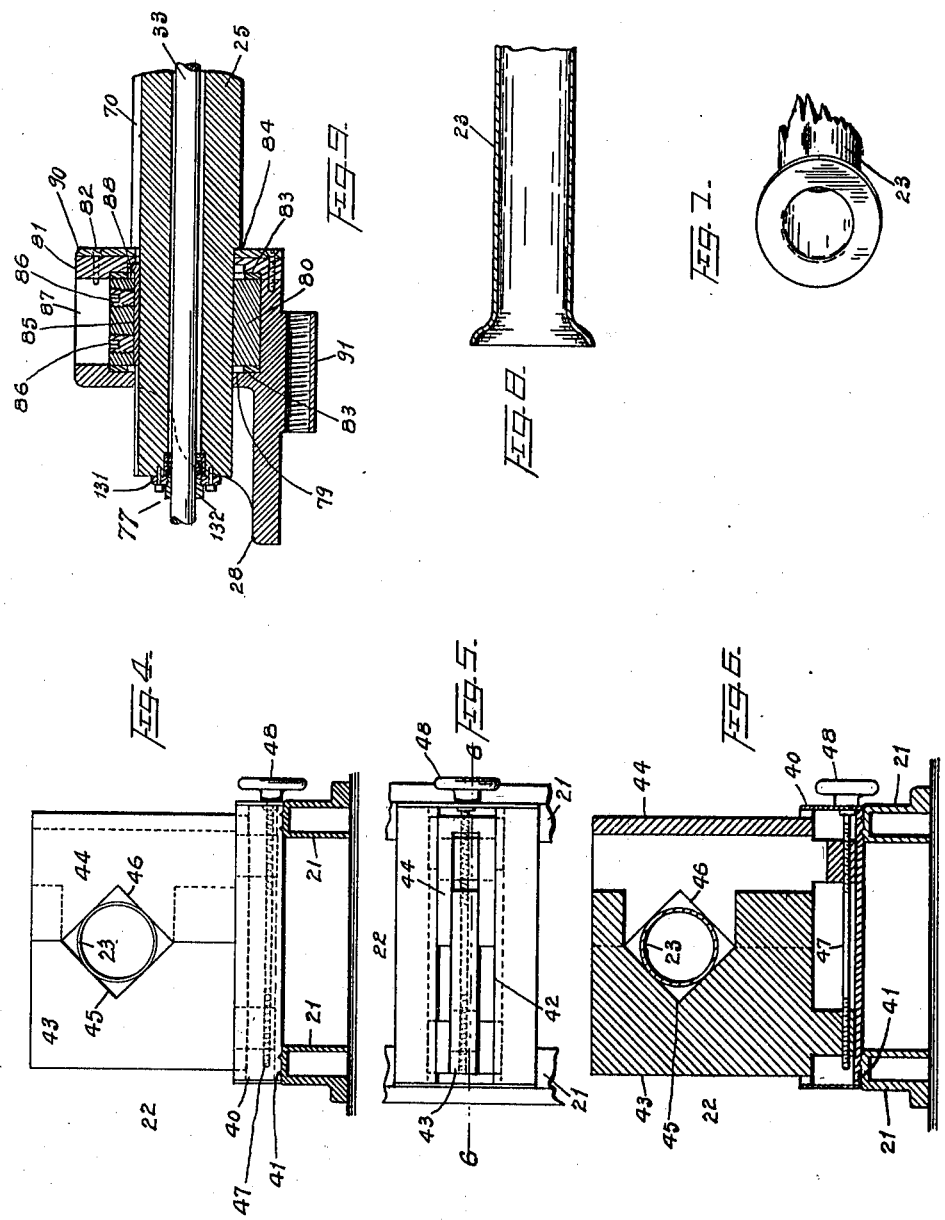
WITNESSES
INVENTOR
ATTORNEY.

R. W. STOCK.
PIPE FLANGING MACHINE.
APPLICATION FILED DEC. 14, 1908.
1,004,492.
Patented Sept. 26, 1911.
7 SHEETS—SHEET 3.
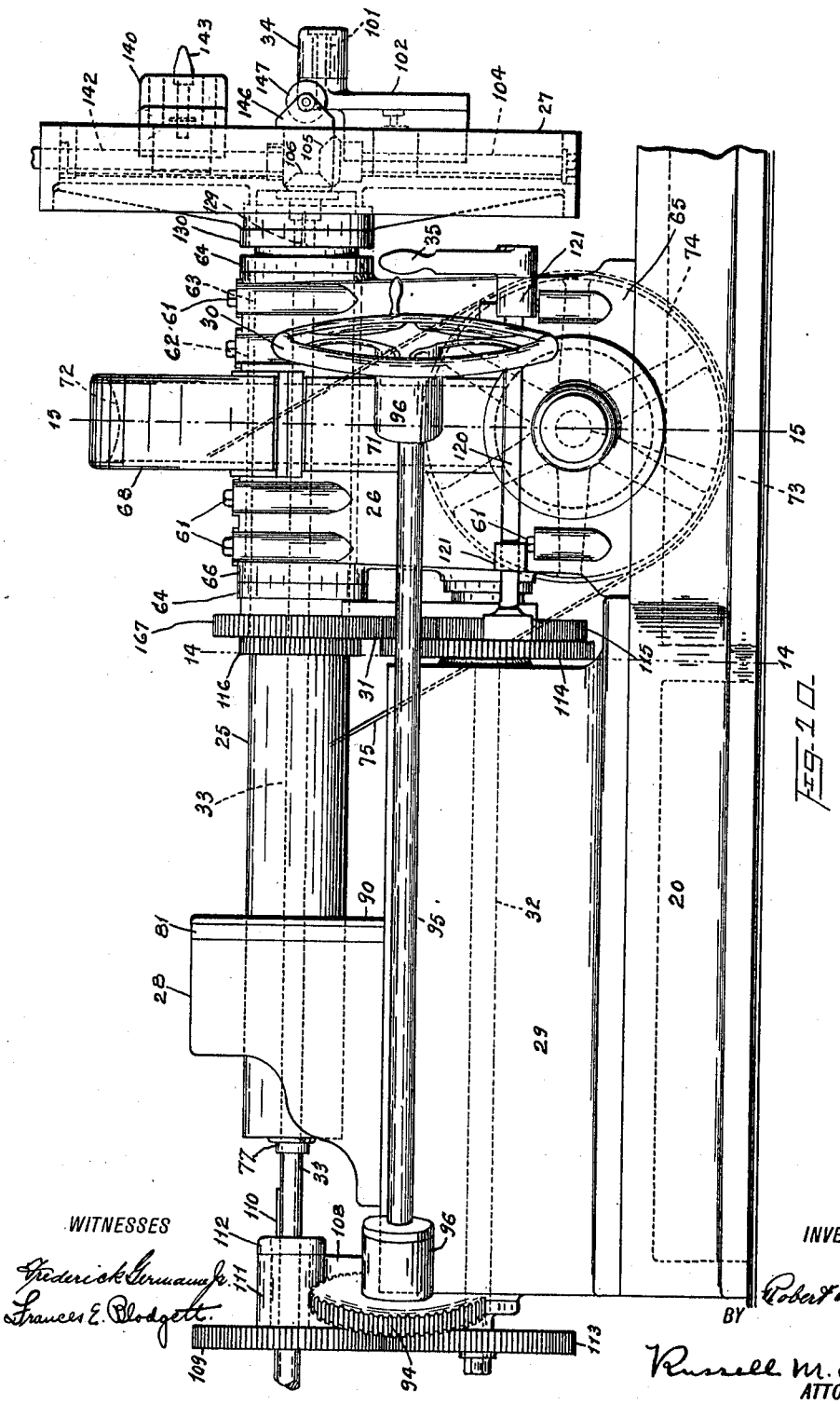

R. W. STOCK.
PIPE FLANGING MACHINE.
APPLICATION FILED DEC. 14, 1908.
1,004,492.
Patented Sept. 26, 1911.
7 SHEETS—SHEET 4.
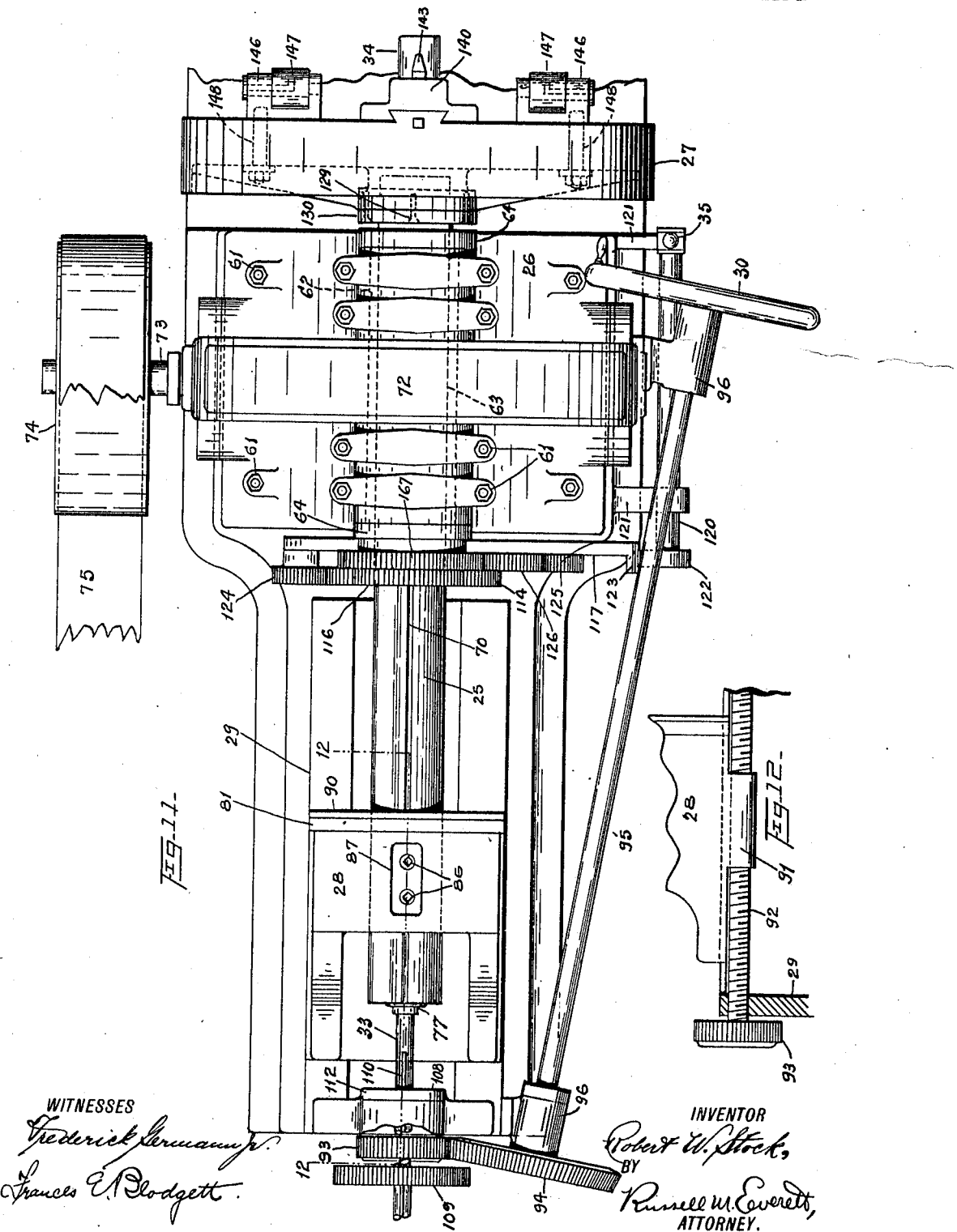

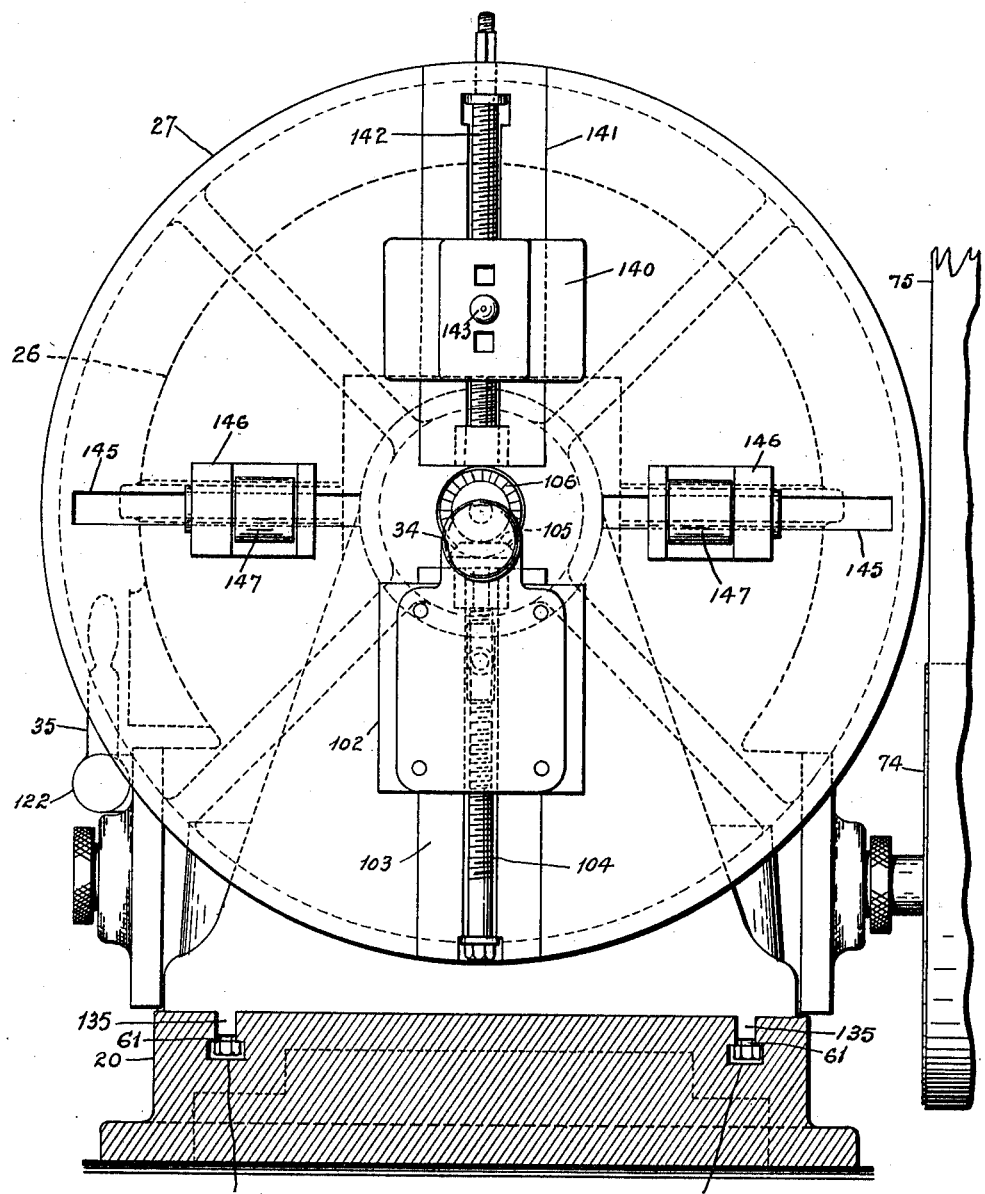

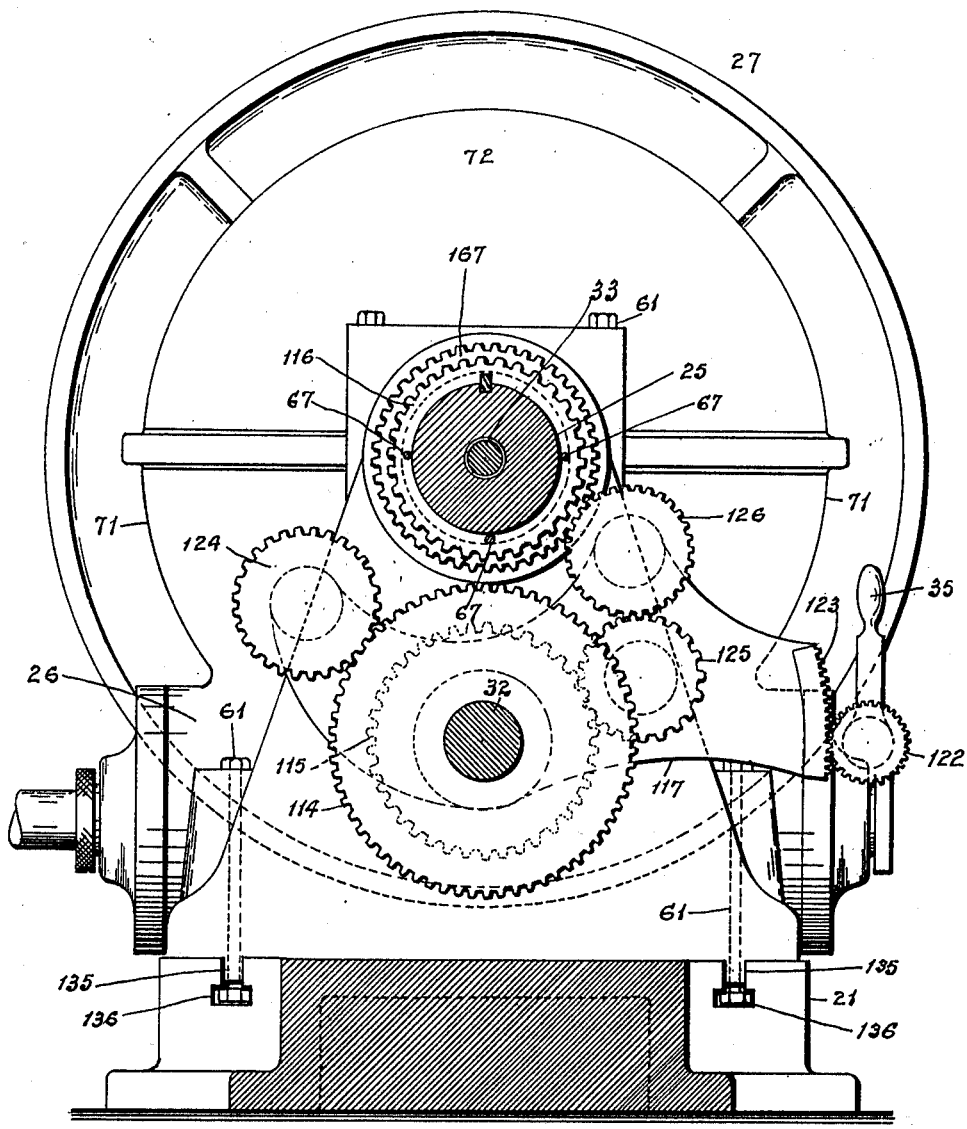

R. W. STOCK.
PIPE FLANGING MACHINE.
APPLICATION FILED DEC. 14, 1908.

1,004,492.

Patented Sept. 26, 1911.
7 SHEETS—SHEET 7.

WITNESSES
Frederick Germann Jr.
Frances E. Blodgett.

INVENTOR
Robert W. Stock,
BY
Russell M. Everett,
ATTORNEY.

UNITED STATES PATENT OFFICE.

ROBERT W. STOCK, OF NEWARK, NEW JERSEY, ASSIGNOR TO SIMMONS PIPE BENDING WORKS, A CORPORATION OF NEW JERSEY.

PIPE-FLANGING MACHINE.

1,004,492.  Specification of Letters Patent.  Patented Sept. 26, 1911.

Application filed December 14, 1908. Serial No. 467,522.

*To all whom it may concern:*

Be it known that I, ROBERT W. STOCK, a citizen of the United States, residing at Newark, in the county of Essex and State of New Jersey, have invented certain Improvements in Pipe-Flanging Machines, of which the following is a specification.

This invention relates to the fitting and joining together of sections of large steel pipe, and more particularly to the formation of the outwardly projecting peripheral flanges at the ends of such pipe sections by means of which they are connected to each other. These flanges commonly project at right angles to the length of the pipe, about two or three inches in width and are adapted to be clamped flatwise together in joining two pipe sections. Heretofore, a flange of this sort has been made by heating the end of the pipe and then hammering its edges over by hand, the operation usually requiring several heats and involving much time and labor, which labor was necessarily skilled in order to secure an accurate flange which would insure a proper joining of the pipe sections in true alinement.

The objects of the present invention are to enable such flanging of pipe sections to be done by machinery; to thus insure greater accuracy and uniformity in the flanges; to enable the flanging to be done in a single heating of the pipe; to save time and labor; to enable different sizes or diameters of pipe to be flanged in the same machine; to form the flange by working from its inner edge outward; to form the flange by a continuous pressure instead of percussive blows; to enable such pressure to be varied and controlled by the operator, and to obtain other advantages and results as may be brought out in the following description.

Referring to the accompanying drawings, in which like numerals of reference indicate corresponding parts in each of the several figures, Figure 1 is a side elevation of my improved machine; Fig. 2 is a rear elevation of the pipe-supporting means taken on line 2—13, Fig. 1; Fig. 3 is a horizontal section of said pipe-holding means taken on line 3—3 of Fig. 2; Fig. 4 is a vertical cross section taken near the front end of the machine on line 4—4 of Fig. 1, showing certain means for supporting the rear end of the pipe; Fig. 5 is a plan of said auxiliary pipe-supporting means, and Fig. 6 is a section of the same on line 6—6 of Fig. 5; Fig. 7 shows a pipe end as flanged, and Fig. 8 is a sectional view of the pipe end in process of flanging; Fig. 9 is a vertical longitudinal section of a detail of the rear or flanging portion of my improved machine, as distinguished from the front or pipe-holding portion; Fig. 10 is a side elevation of the said rear or flanging portion of the machine; Fig. 11 is a plan of the same; Fig. 12 is a vertical section of a portion of the same on line 12—12, Fig. 11; Fig. 13 is a face view of the flanging head, looking rearward, the frame of the machine being in section on line 2—13 of Fig. 1; Fig. 14 is a cross section of the machine on line 14—14 of Fig. 10, illustrating certain means for changing the direction of rotation of a spindle, and Fig. 15 is a cross section at line 15—15, Fig. 10, showing the driving worm and worm-wheel.

In said drawings and particularly Fig. 1 thereof, 20 indicates a suitable bed or base providing at the front end of the same parallel slideways or tracks 21, 21. Upon said slideways 21, 21 is an adjustable support 22 for the pipe 23 to be flanged. The end of said pipe 23 which is to be operated upon projects through clamping dies in a frame 24 mounted transversely upon the bed 20 in fixed position and extending vertically upward therefrom. At the opposite side of said frame 24, or at the rear end of the bed or base 20, are the means for flanging the pipe end. These means comprise briefly a spindle 25 rotatable in a housing 26 fixed upon the bed 20, and carrying at its forward end a flanging head or disk 27. This spindle 25 is adapted to be moved longitudinally by a carriage 28 which slides upon an upward extension 29 of the bed 20 by means of a hand wheel 30. Furthermore, the spindle drives through reversing gears 31 and counter shaft 32, a shaft 33 which extends axially through the spindle to move the flanging tool or roll 34 radially of the flanging head 27. Said reverse gears are shifted by the hand lever 35, according as it is desired to move said flanging roll 34 outward or inward with respect to the center of the flanging head. All these different parts will next be taken up in detail.

Referring to Figs. 4, 5 and 6 particularly, in connection with Fig. 1, the adjustable support 22 comprises a base 40 which is adapted to slide upon the tracks 21, 21 in any manner common to lathes and the like. Ribs are shown upon the tracks entering grooves in the base 40, as at 41, so as to prevent displacement from proper transverse position, and while in the drawings the support 22 would have to be pushed along the tracks by hand, it is obvious that any common and well known means of propulsion by power could be applied if desired.

In an undercut slideway 42 of the base 40, extending longitudinally of the same or transversely of the bed 20 of the machine, are mounted the feet of upwardly projecting jaws 43, 44. These jaws are adapted to one slide into the other, as 43 into 44, and their inner vertical edges are provided with opposite V-shaped recesses 45, 46, respectively. These recesses provide an aperture at the center of the support 22, to receive and hold the pipe 23, and obviously as the jaws are moved toward or away from each other, the size of said hole is varied to suit different sizes of pipe. Such movement of the jaws 43, 44 is accomplished by a right and left hand threaded screw 47 extending through their feet, and adapted to be turned by a hand wheel 48 at the operator's side of the machine.

Coming now to the frame 24 which supports the extreme end of the piece of pipe being flanged, it should be noted that this frame is fixed upon the bed 20 by its lower portion 50 being bolted thereto. This lower portion 50 provides a rectangular opening or slideway 51 in which upper and lower clamping dies 52 and 53 are placed. These dies have in their adjacent horizontal edges recesses 54, 55 which together makes an opening of the proper shape and size to firmly grasp the pipe. Obviously different dies must be employed for different sizes of pipe, and to facilitate such change in dies the side walls 56 of the slideway 51 toward the rear of the machine are made removable.

The upper portion 57 of the frame 24 is bolted to the lower portion 50 by means of long bolts 58 and supports at its top a compressed air cylinder 59 whose piston 60 is adapted to be detachably connected to the upper die 52 to raise the same and to force it downward against the pipe 23 to hold said pipe firmly while being flanged. It will be understood that only so much of the end of the pipe as it is desired to bend over into a flange, projects beyond the dies 52, 53, and the means for spreading this projecting portion outwardly and bending it over flat upon the dies, as shown in Fig. 7, will next be described.

Adjacent to the frame 24 and at the rear thereof, a housing or casting 26 projects up from the bed 20, being firmly bolted thereto as at 61. This housing 26 provides at its top a horizontal boring extending longitudinally, and providing a bearing 62 for a sleeve 63 mounted therein, and held against longitudinal displacement by collars 64, 64 bolted against its ends outside the bearing 62. This sleeve, in turn, provides a bearing for the spindle 25, and is rotatably held thereon by a spline 65 entering a groove or keyway 70 of the spindle. Said keyway 70 extends practically the whole length of the spindle, and the key or spline 65 is held against longitudinal escape by the end collars 64. The sleeve 63 has at about the middle of its bearing in the housing 26 a worm-wheel 68 rotatably connected to the sleeve by a key 69 entering a longitudinal slot or keyway 66 of the sleeve. The housing 26 has extensions 71 at its sides and there is a separate casing 72 at the top of the housing 26 to provide a chamber for the worm-wheel 68.

In the lower part of the housing 26 is transversely journaled a driving shaft 73, provided at one side of the machine with a pulley 74 adapted to receive a driving belt 75. Within the housing this driving shaft 73 has fast upon itself a worm 76 engaging the worm-wheel 68, and thus the spindle 25 is rotated. Upon the front end of said spindle 25, or end next the frame 24, is fixed a head or disk 27, and from the face of this disk projects the flanging tool 34. Obviously to adjust this tool toward and away from the pipe end being flanged, the spindle 25 must slide longitudinally, and such movement is accomplished as follows:

At the rear of the housing 25 there is a block or upward extension 29 upon the bed 20, and which at its top provides a horizontal slideway longitudinally of the machine for a carriage 28. This carriage, as shown in Fig. 9, provides at its upper part a bearing or chamber 79 for a collar 80 upon the spindle. This chamber 79 is open at the front wall of the carriage, for the insertion of said collar, and the collar is afterwards retained by a plate 81 held by screws 82 to the front wall of the carriage. Friction washers 83 are provided at the sides of the collar 80, and said collar is preferably upon a reduced portion of the spindle 25 so as to engage a shoulder 84 when moving the spindle forward. The collar 80 is keyed to the spindle by a key 85 entering the slot 70 of the spindle, and said key is preferably clamped in position by set screws 86 in the collar 80 and which are accessible through an opening 87 in the top of the carriage. To further guard against any possibility of escape of the key 85 it is provided with a head 88 which lies in an annular space 89 provided by making the shaft opening of the end plate 81 larger than the shaft. An auxiliary plate or ring 90 upon the outside of said plate 81 then confines the key 85 positively.

At its under side, the carriage 28 has an interiorly threaded sleeve 91 to receive a screw shaft 92, (see Fig. 12), said screw shaft being suitably mounted to turn without longitudinal motion in the block or upward extension 29. At its outer end at the rear end of the machine, this screw shaft 92 has a pinion 93 which meshes into a gear-wheel 94 on a shaft 95 mounted in bearings 96, 96 at the outside of the machine next the operator and adapted to be turned by the hand-wheel 30. By turning said hand-wheel 30, therefore, the operator can slide the spindle to move the flanging head and its roll 34 toward and away from the pipe being flanged.

The flanging tool comprises the roll 34 mounted upon the pin 101 of a holder 102, which holder is adapted to slide upon a radial slideway 103 of the flanging head. For sliding said holder, a screw shaft 104 is mounted in the slideway 103 to turn without longitudinal movement, said screw shaft passing through a threaded sleeve on the holder. This screw shaft has at its inner end, at the center of the flanging head, a bevel gear 105 which engages a corresponding bevel gear 106 of the shaft 33, which extends axially through the spindle 25. This shaft 33 has a bearing in the flanging head, and also one in the carriage 28, as at 77 in Figs. 9 and 10, and still another one at the extreme rear end of the machine upon the block 29. This last bearing is effected in the following manner. Outside of the post 108 upon the block 29 is a gear 109, which is keyed to the shaft 33 by a long spline 110 on said shaft. The said gear 109 has a hub or stem 111 extending through the post 108 to turn therein, said stem inclosing the shaft and its spline and being provided at the inner end with a collar 112 which engages that side of the bearing 108 to hold the gear 109 in place. Rotation of this gear 109 will therefore turn the shaft 107, without in any way interfering with its longitudinal movement due to the sliding of the spindle 25.

To drive the gear 109, it meshes with a second gear 113 below, and which second gear is fast on a shaft 32 which extends longitudinally of the machine through the block 29 and has fast upon its forward end gear-wheels 114, 115. The said gears 114, 115 are in the same vertical planes with gear-wheels 116, 167 on the spindle 25 adjacent to the housing 26 and which last-mentioned gear-wheels are made fast to the sleeve 63 by having the bolts or screws 67 which hold the end collar 64 to the said sleeve passed also through the said gear wheels. The gear 116 and 114 and the gears 167 and 115 form the pairs, through either of which motion can be transmitted from the spindle to the counter-shaft 32, and the reason for two pairs is so that the flanging tool can be moved more rapidly when idle than when working, in practice about four times as fast.

For transmitting motion between the gears of each pair, 116 and 114 or 167 and 115, pinions of the reverse gearing 31 lie in the same plane therewith and are carried by a lever 117. This lever 117 is pivoted upon a stud of the housing 26 in alinement with the counter-shaft 32, and is adapted to be rocked by the hand lever 35 on a shaft 120 mounted in bearings 121 at the side of the machine next the operator and carrying at its opposite end a pinion 122 engaging a rack 123 on the lever 117. The said lever has at one side of the machine a single pinion 124 which always engages the gear 114 and can also be swung into engagements with gear 116 to transmit motion therefrom to turn the countershaft 32 in one direction. At the other side of the machine are two pinions 125 and 126 mounted upon the lever 117, the pinion 125 always meshing with the gear 115 and the pinion 126 meshing with the pinion 125 but not the gear wheel 115. When the lever is swung to throw the pinion 124, before described, away from the driving gear 116, the pinion 126 engages the driving gear 167 as shown in Fig. 14 and thus transmits motion to the gear-wheel 115 to turn the shaft 32 in the opposite direction from that in which it was turned by transmission through the single pinion 124. The holder 102 of the flanging tool or roll 34 can thus be moved in either direction, outward or inward, as the machine runs, and without interfering with the longitudinal motion of the spindle 25. The proportions of gears is such that the flanging roll will be moved one-eighth of an inch to each revolution of the spindle when working, and will be moved one-half of an inch for each revolution of the spindle when it is idle.

The flanging head or disk 27 is preferably made fast on the end of the spindle by being driven on hydraulically against an integral collar 130 on the spindle, and then bolts or screws 129 passed through the said collar and disk.

In order that the spindle shaft 33 shall turn with the spindle 25 when the reverse gearing 31 is in idle position, and the flanging roll be stationary with respect to the flanging head, the said shaft 33 is provided at the rear end of the spindle with a bearing 106 therein which can be tightened upon the spindle shaft 33 after the manner of a stuffing box. This is shown particularly in Fig. 9 of the drawings, where 131 indicates a bushing in the rear end of the spindle 25, and 132 is a gland which can be screwed into said bushing to jam packing therein against the spindle shaft 33.

The housing 26 has bottom ribs or feet 135 which project into T-slots 136 of the base or bed plate 20, as shown in Fig. 13, to hold said housing against any displacement. The heads of the bolts 61 which fasten said housing to the bed plate lie in the lower enlarged portions of said T-slots.

Diametrically opposite the flanging tool holder 102 and its screw shaft 104, on the flanging head, is another tool holder 140 mounted in a slideway 141 and adapted to be moved radially by a screw shaft 142 mounted in said slideway to rotate without moving longitudinally. This screw shaft 142 is not connected to the power shaft 33 at the center of the flanging head, but is adapted to be turned by a wrench at its other end. This auxiliary tool holder is adapted to carry any kind of a tool which may be found useful in connection with flanging pipe ends by means of a flanging roll, such for instance, as a cutter 143 which could be utilized for facing or the like.

In a line at right angles to the line of the flanging roll 34 and cutter 143 are slots 145 in the flanging head of disk 27, disposed radially thereof and on opposite sides of the center. Each of these slots receives the stem of a carrier 146, which carrier can thus be adjusted by sliding along the slot, and held fixed at any desired radial point by means of a clamping bolt 148 or the like at the rear. These carriers 146 each have mounted in itself a flattening roll 147, whose axis is in radial line of the flanging head, and these flattening rolls are adapted to engage the flange of a pipe and to press the same firmly against the dies holding the pipe, and thus make said flange exactly perpendicular to the pipe.

In operation, a pipe having been firmly secured in the support 22 and clamping dies 52, 53, the flanging head is moved forward, with the flanging roll near its center, until said roll is inserted into the pipe end to the point at which the flange is to be located. This is at a distance from the rear face of the dies 52, 53, equal to the thickness of the walls of the pipe. The gearing 31 is then thrown in to feed the flanging roll radially outward, and said roll accordingly soon engages the inner walls of the pipe and begins to form what is to be the inner edge of the flange. At the same time this occurs, the spindle 25 with its flanging head 37 and flanging roll 34 are moved rearward, very slowly, by means of the hand-wheel 30. The result of all these motions imparted to the flanging roll is that it forms a flaring or conical flange on the pipe, as is shown in process of formation in Fig. 8. When the flanging roll has finished such a flange, it is brought again to the center of the flanging head, and said flanging head advanced toward the end of the pipe to cause the flattening rolls 147 to engage the said flaring flange and press the same flat against the dies 52, 53 into a position at right angles to the pipe.

The frame 24 is preferably held to the bed 20 by bolts 36 passed through slots 37 in the bed so as to permit of a limited adjustment.

Having thus described the invention, what I claim is:

1. The combination of a body portion providing journal bearings, a sleeve fitting exteriorly in said bearings, means holding said sleeve against longitudinal movement in said bearings, means for rotating said sleeve continuously in one direction, a hollow spindle keyed in said sleeve to slide longitudinally thereof and to rotate therewith, means for sliding said spindle in said sleeve, a shaft rotatable in said hollow spindle, and means for transmitting motion from said sleeve to said shaft to rotate it in both directions.

2. The combination of a body portion providing journal bearings, a sleeve fitting exteriorly in said bearings, means holding said sleeve against longitudinal movement in said bearings, means for rotating said sleeve, a hollow spindle keyed in said sleeve to slide longitudinally thereof and to rotate therewith, means for sliding said spindle in said sleeve, a shaft rotatable in said hollow spindle, and means for transmitting motion from said sleeve to said shaft to rotate it at different speeds in opposite directions.

3. A pipe flanging machine comprising a bed with journal bearings at its upper part, a sleeve in said bearings, means holding said sleeve against longitudinal movement in said bearings, means for rotating said sleeve, a hollow spindle keyed in said sleeve to slide longitudinally thereof and to rotate therewith, a flanging head on said spindle, means for sliding said spindle, a shaft in said hollow spindle, a counter-shaft on said bed, means for transmitting motion from said sleeve to rotate said counter-shaft in either direction, and means for transmitting motion from said counter-shaft to said shaft in the spindle.

4. A pipe flanging machine comprising a bed with journal bearings at its upper part, a sleeve in said bearings, means for holding said sleeve against longitudinal movement in said bearings, means for rotating said sleeve, a hollow spindle keyed in said sleeve to slide longitudinally thereof and to rotate therewith, a flanging head on said spindle, means for sliding said spindle, a shaft in said hollow spindle, a counter-shaft on said bed, gears on said counter-shaft, driving gears on said sleeve, reversing means for transmitting motion from either of said driving gears to its respective gear on the counter-shaft, and means for transmitting motion from said counter-shaft to said shaft in the spindle.

5. A pipe flanging machine comprising a bed with journal bearings at its upper part, a sleeve in said bearings, means holding said sleeve against longitudinal movement in said bearings, means for rotating said sleeve, a hollow spindle keyed in said sleeve to slide longitudinally thereof and to rotate therewith, a flanging head on said spindle, means for sliding said spindle, a shaft in said hollow spindle adapted to move longitudinally therewith and capable of independent rotation, a gear slidably keyed on said shaft, a bearing on the bed for said gear, means holding said gear against longitudinal movement, and means for transmitting motion to said gear from said sleeve, whereby the said shaft may be given a different rotary movement from that of the spindle.

6. A pipe flanging machine comprising a bed with journal bearings at its upper part, a sleeve in said bearings, means holding said sleeve against longitudinal movement in said bearings, means for rotating said sleeve, a hollow spindle keyed in said sleeve to slide longitudinally thereof and to rotate therewith, a flanging head on said spindle, means for sliding said spindle, a shaft in said hollow spindle, a gear slidably keyed on said shaft, a bearing on the bed for said gear, means holding said gear against movement longitudinally of the shaft, a counter-shaft on the bed, means for transmitting rotation between said counter-shaft and gear, and means for transmitting motion between said sleeve and counter-shaft, one of said transmitting means being reversible as to direction of turning of the driven part.

7. A pipe flanging machine comprising a bed with journal bearings at its upper part, a sleeve in said bearings, means holding said sleeve against longitudinal movement in said bearings, means for rotating said sleeve, a hollow spindle keyed in said sleeve to slide longitudinally thereof and to rotate therewith, a flanging head on said spindle, means for sliding said spindle, a shaft in said hollow spindle adapted to move longitudinally therewith and capable of independent rotation, a gear slidably keyed on said shaft, a bearing on the bed for said gear, means holding said gear against longitudinal movement, and means for transmitting motion to said gear from said sleeve to rotate it at different speeds in opposite directions.

8. A pipe flanging machine comprising a bed with its upper part providing journal bearings at its forward end and a slideway at its rear end, a sleeve in said journal bearings, means holding said sleeve against longitudinal movement, means for rotating said sleeve, a spindle keyed in said sleeve and adapted to slide longitudinally therein, said spindle having a reduced rear end forming a rearwardly facing shoulder, and a flanging head on said spindle, a carriage on said slideway through which the said spindle extends and which has an annular chamber transversely of the shaft, open at its side next said shoulder, a collar fast on the spindle in said chamber, a closure for the open side of said chamber next the shoulder, said carriage adapted to engage said shoulder, and means for reciprocating the carriage.

9. A pipe flanging machine comprising a bed with journal bearings at its upper part, a sleeve on said bearings, means holding said sleeve against longitudinal movement in said bearings, means for rotating said sleeve, a hollow spindle keyed in said sleeve to slide longitudinally thereof and to rotate therewith, a flanging head on said spindle, means for sliding said spindle, a shaft in said hollow spindle, means for transmitting motion from said sleeve to said shaft, a carriage on said slideway having an engagement with said spindle allowing the spindle to rotate and holding it against longitudinal movement with respect to the carriage, and means for moving said carriage independent of the rotation of said sleeve and shaft in the spindle.

10. A pipe flanging machine comprising a bed with journal bearings at its upper part, a sleeve in said bearings, means holding said sleeve against longitudinal movement in said bearings, means for rotating said sleeve, a hollow spindle keyed in said sleeve to slide longitudinally thereof and to rotate therewith, a flanging head on said spindle, means for sliding said spindle, a shaft in said hollow spindle, means for connecting said shaft to rotate with said sleeve and disconnecting it therefrom, and means between said hollow spindle and shaft in frictional engagement therewith.

11. A pipe flanging machine comprising a bed with journal bearings at its upper part, a sleeve in said bearings, means holding said sleeve against longitudinal movement in said bearings, means for rotating said sleeve, a hollow spindle keyed in said sleeve to slide longitudinally thereof and to rotate therewith, a flanging head on said spindle, means for sliding said spindle, a shaft in said hollow spindle, means for connecting said shaft to rotate with said sleeve and disconnecting it therefrom, and an adjustable stuffing or packing between said hollow spindle and shaft therein frictionally engaging both of them at the same time.

12. A pipe flanging machine, comprising a bed providing at one end a horizontal slideway, pipe supporting means adapted to travel on said slideway, a frame extending vertically upward from said bed intermediate of its ends and adapted to be fixed thereon, said frame providing a vertical slideway upper and lower dies removably mounted in said slideway and providing at their adjacent edges a seat for a pipe, means on said frame above said slideway for raising and lowering the upper die in said slideway, a flanging tool at the side of said frame opposite the said pipe supporting means adapted to project into the pipe, and means for rotating said flanging tool and forcing it against the inner wall of the pipe.

ROBERT W. STOCK.

In the presence of—
  RUSSELL M. EVERETT,
  FRANCES E. BLODGETT.

Copies of this patent may be obtained for five cents each, by addressing the "Commissioner of Patents, Washington, D. C."